UNITED STATES PATENT OFFICE.

EDWARD S. GARVEY, OF CLAYTON, MISSOURI.

INK AND METHOD OF MAKING THE SAME.

1,422,957. Specification of Letters Patent. Patented July 18, 1922.

No Drawing. Application filed May 23, 1921. Serial No. 471,927.

*To all whom it may concern:*

Be it known that I, EDWARD S. GARVEY, a citizen of the United States of America, and a resident of Clayton, in the county of St. Louis and State of Missouri, have invented certain new and useful Improvements in Inks and Methods of Making the Same, of which the following is a full, clear, and exact description.

This invention relates to improvements in inks and methods of making the same, one of the objects being to produce a writing ink, or lettering ink that will dry very quickly when applied to the surface of metal or other non-absorbent material.

Another object is to produce a quick-drying waterproof ink of this kind that will firmly adhere to the metal or other non-absorbent material, so that the writing or letting cannot be washed away or blurred by water, nor erased by the friction to which large metal sheets are ordinarily subjected when rubbed against each other.

A further object is to provide an ink of this kind consisting of a number of ingredients united in the form of a solution requiring no shaking or agitation after it has been once prepared for use.

Prior to this invention, ink has been prepared for the purpose of writing on metal sheets, and in factories where large numbers of such sheets are handled it is desirable to use an ink that will dry very quickly, for to avoid the labor and expense of unnecessary handling of numerous sheets as well as the expense of maintaining a large storage space for the sheets, they should be arranged in piles immediately after the ink has been applied to their surfaces. However, there are a number of problems involved in the production of a satisfactory quick-drying ink, and so far as I am aware there has been no entirely satisfactory ink produced for this purpose at any time prior to the present invention or discovery.

Since practically none of the ink will be absorbed by the metal to which it is applied, the drying operation depends entirely upon evaporation, and for this reason the desired ink composition must differ from that of ordinary quick-drying inks intended for use on paper and other absorbent material. The main object is to produce an entirely satisfactory ink that will become dry almost instantly when applied to a non-absorbent surface, thereby overcoming the labor and expense of handling articles with wet ink on their surfaces. However, the desired product must also have other essential properties. It must firmly adhere to the non-absorbent surface so that it cannot be readily erased. It should be in the form of a thin fluid which will freely flow from the pen, brush or other writing instrument, and it is preferably waterproof so that it will not be washed away or blurred by water to which the metal sheets are sometimes subjected. The ink should also be in the form of a permanent solution which will not settle in the container and thereby require agitation of the mixture before using the ink.

Of course all of these properties are not absolutely essential, but they are all highly desirable, and they are all found in the preferred form of my invention. Moreover, actual use of the particular ink composition herein described has shown that when applied to a metal surface it will dry in a few seconds.

As an illustration of one form of the invention, I will set forth a specific formula and a method of combining the ingredients, so as to produce an ink having all of the important advantages herein pointed out, but it is to be understood that the invention is not limited to this specific formula.

6 pounds of dry shellac dissolved in alcohol.

3 ounces of aniline dye.

4 gallons of alcohol, preferably denatured alcohol.

These ingredients are commingled with each other to produce a colored solution of alcohol and shellac. The six pounds of shellac may be placed in a gallon measure into which sufficient alcohol is poured to fill the measure, and this mixture is combined with the four gallons of alcohol and the aniline dye.

In the preferred form of the invention, the dye is mixed with and dissolved in the four gallons of alcohol, thus producing a colored solution of alcohol. The six pounds of shellac is dissolved in less than one gallon of hot alcohol, and the resultant solution of alcohol and shellac is thereafter commingled with the colored solution of alcohol.

In addition to having all of the advantages heretofore pointed out, the ink herein disclosed will not in any way injure the metal sheet to which it is applied.

I claim:

The herein described ink comprising aniline dye comminged with alcohol and shellac in proportions approximately as follows: aniline dye three ounces, alcohol four gallons and shellac six pounds.

In testimony that I claim the foregoing I hereunto affix my signature.

EDWARD S. GARVEY.